US009894832B2

(12) United States Patent  
Scrivner et al.

(10) Patent No.: US 9,894,832 B2  
(45) Date of Patent: Feb. 20, 2018

(54) DUAL FUNCTION BASECUTTERS

(71) Applicant: DEERE & COMPANY, Moline, IL (US)

(72) Inventors: John P. Scrivner, Thibodaux, LA (US); Kerry J Morvant, Thibodaux, LA (US); Marlin L. Goodnight, Thibodaux, LA (US); Satyam Suraj Sahay, Pune (IN); Goutam Mohapatra, Bhubaneswar (IN); Pritpal Singh, Noida (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/788,505

(22) Filed: Jun. 30, 2015

(65) Prior Publication Data

US 2016/0073580 A1    Mar. 17, 2016

Related U.S. Application Data

(60) Provisional application No. 62/051,799, filed on Sep. 17, 2014.

(51) Int. Cl.
| | |
|---|---|
| *A01D 34/00* | (2006.01) |
| *A01D 34/66* | (2006.01) |
| *A01D 34/73* | (2006.01) |
| *A01D 34/76* | (2006.01) |
| *A01D 45/10* | (2006.01) |
| *G05B 15/02* | (2006.01) |

(52) U.S. Cl.  
CPC ......... *A01D 34/006* (2013.01); *A01D 34/668* (2013.01); *A01D 34/73* (2013.01); *A01D 34/76* (2013.01); *A01D 45/10* (2013.01); *G05B 15/02* (2013.01)

(58) Field of Classification Search  
None  
See application file for complete search history.

(56) References Cited

U.S. PATENT DOCUMENTS

| | | | | |
|---|---|---|---|---|
| 4,008,557 A | * | 2/1977 | Ruback | .................. A01D 45/10 56/63 |
| 4,019,308 A | | 4/1977 | Quick | |
| 4,722,174 A | * | 2/1988 | Landry | .................. A01D 45/10 56/119 |

(Continued)

FOREIGN PATENT DOCUMENTS

BR    PI1001087    6/2011

*Primary Examiner* — Bhavesh V Amin  
(74) *Attorney, Agent, or Firm* — Lorenz & Kopf, LLP

(57) ABSTRACT

A basecutter and a method for controlling a basecutter are described for a sugarcane harvester. A basecutter may include a cutting spindle, a transport spindle, at least one power source configured to rotate the cutting spindle and the transport spindle, one or more cutting blades attached to the cutting spindle, and one or more transport devices attached to the transport spindle. The cutting spindle or the transport spindle may be configured to rotate within the other. The cutting spindle and the transport spindle may be rotated at different speeds by the at least one power source. For example, a controller may determine a cutting speed for the cutting spindle and a transport speed for the transport spindle and control the at least one power source to rotate the cutting and transport spindles at the cutting and transport speeds, respectively.

18 Claims, 9 Drawing Sheets

(56) References Cited

U.S. PATENT DOCUMENTS

| | | | |
|---|---|---|---|
| 5,191,759 A | 3/1993 | Baker | |
| 5,237,804 A * | 8/1993 | Bertling | A01D 43/082 56/102 |
| 5,722,225 A * | 3/1998 | Wuebbels | A01D 43/082 56/119 |
| 5,749,208 A * | 5/1998 | Wuebbels | A01D 43/082 56/10.3 |
| 5,852,922 A * | 12/1998 | Over Behrens | A01D 43/082 56/102 |
| 6,032,444 A * | 3/2000 | Herron | A01D 43/082 56/102 |
| 6,363,700 B1 * | 4/2002 | Fowler | A01D 45/10 56/13.3 |
| 6,807,799 B2 * | 10/2004 | Reaux | A01D 45/10 56/13.9 |
| 6,826,897 B2 * | 12/2004 | Wubbels | A01D 43/082 56/51 |
| 6,910,321 B2 * | 6/2005 | Hinds | A01D 45/10 56/63 |
| 7,028,458 B2 * | 4/2006 | Bruening | A01D 43/082 56/51 |
| 7,222,478 B2 * | 5/2007 | Bruening | A01D 43/082 56/503 |
| 7,571,592 B2 * | 8/2009 | Rickert | A01D 43/082 56/157 |
| 7,905,079 B2 | 3/2011 | Wolters et al. | |
| 8,230,668 B2 | 7/2012 | Hinds | |
| 8,230,669 B2 | 7/2012 | Hinds | |
| 8,650,846 B2 | 2/2014 | Wuebbels | |

* cited by examiner

DUAL FUNCTION BASECUTTERS

CROSS-REFERENCE TO RELATED APPLICATION(S)

This application claims priority to U.S. provisional application No. 62/051,799, which was filed on Sep. 17, 2014.

STATEMENT OF FEDERALLY SPONSORED RESEARCH OR DEVELOPMENT

Not applicable.

FIELD OF THE DISCLOSURE

This disclosure relates to sugarcane harvesters, and in particular to basecutters for sugarcane harvesters.

BACKGROUND OF THE DISCLOSURE

Harvesters of various types, including sugarcane harvesters, may include harvesting devices of various types. Harvesting devices for a sugarcane harvester may include, for example, assemblies for cutting, chopping, sorting, transporting, and otherwise gathering and processing sugarcane plants. Typical harvesting devices may include basecutter assemblies (or "basecutters"), feed rollers, cutting drums, and so on. In various harvesters, harvesting devices may be hydraulically powered by an engine-driven or other pump.

To actively harvest crops, a harvester may move along a field with harvesting devices operating to gather plant material from fields. Certain harvesting devices may also process gathered material in various ways. In known configurations, for example, a basecutter for a sugarcane harvester may be pivotally attached to a frame of the harvester and may include one or more spindles configured to be rotated by one or more hydraulic motors. Multiple cutting blades may be mounted to disks at the ends of the spindles, such that rotating the spindles rotates the blades to cut sugarcane. After sugarcane is cut from the ground by the blades, the rotating disks may direct the cut sugarcane rearward toward the feed train of the harvester (e.g., toward a set of intake feed rollers at the front of the sugarcane chassis). Paddles or other features may also be provided on the spindles, in order to further direct cut sugarcane toward the feed train.

The rotational speed of the cutting blades may be a relevant factor in the effectiveness of cutting operations with a basecutter. The rotational speed of disks, paddles or other features for directing cut sugarcane into the feed train may also be important. Further, configuration of other features of a basecutter, such as cutting blades, paddles, and so on, may also contribute to improved harvesting performance Accordingly, it may be useful to provide a basecutter with improved control of rotational speeds and other improved functionality.

SUMMARY OF THE DISCLOSURE

A basecutter for a sugarcane harvester and a method for controlling a basecutter are disclosed.

According to one aspect of the disclosure, a basecutter may include a cutting spindle, a transport spindle, at least one power source configured to rotate the cutting spindle and the transport spindle, one or more cutting blades attached to the cutting spindle, and one or more transport devices attached to the transport spindle. One of the cutting spindle and the transport spindle may be configured to rotate within another of the cutting spindle and the transport spindle. The cutting spindle and the transport spindle may be rotated at different speeds by the at least one power source. For example, a controller may determine a cutting speed for the cutting spindle and a transport speed for the transport spindle and control the at least one power source to rotate the cutting and transport spindle at the cutting and transport speeds, respectively.

In certain embodiments, a basecutter gearbox may include at least one input interface and first and second output interfaces. The at least one power source may be configured to provide rotational power to the basecutter gearbox via the at least one input interface. The basecutter gearbox may be configured to transmit power received at the at least one input interface to the first and second output interfaces, in order to rotate the first and second output interfaces at different speed. The first and second output interfaces may be configured to rotate the cutting spindle and the transport spindle, respectively.

In certain embodiments, first and second input interfaces may be provided, wherein a first power source is configured to provide rotational power to the cutting spindle via the first input interface and a second power source is configured to provide rotational power to the transport spindle via the second input interface.

In certain embodiments, the cutting spindle and the transport spindle may be rotated in opposite directions. For example, the cutting spindle may be rotated in a first rotational direction, whereby cutting force applied by the attached cutting blades urges sugarcane cut by the cutting blades away from a feed train of the sugarcane harvester, and the transport spindle may be rotated in a second, different rotational direction, whereby the attached transport devices urge cut sugarcane toward the feed train.

In certain embodiments, the one or more transport devices may include a carrying disk, a transport paddle, or one or more transport spokes extending radially outward from the transport spindle. The carrying disk may include one or more transport arms extending radially outward from the transport spindle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
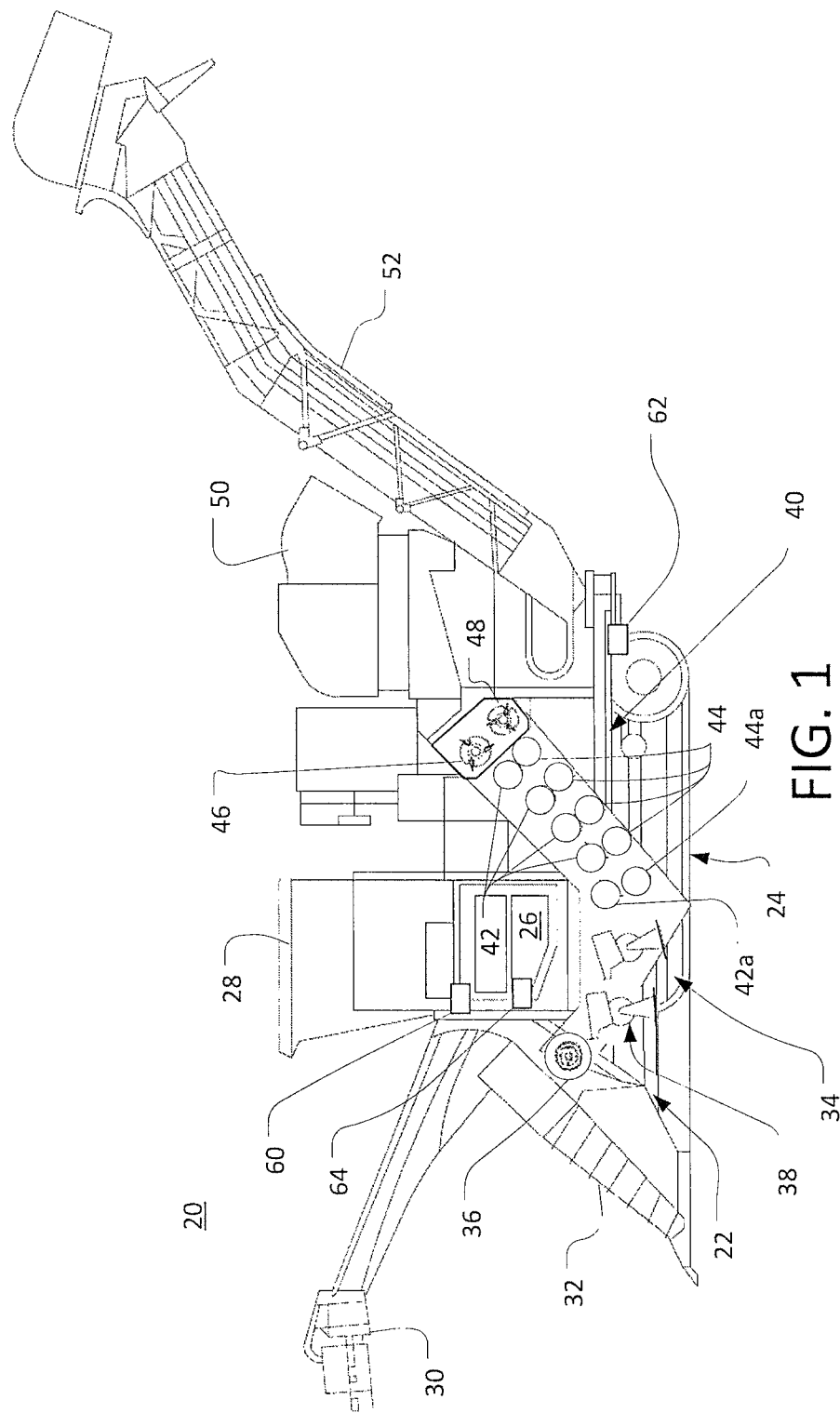
FIG. 1 is a simplified side view of an example sugarcane harvester, which may be equipped with basecutters according to this disclosure.

The following describes one or more example embodiments of the disclosed basecutter, as shown in the accompanying figures of the drawings described briefly above. Various modifications to the example embodiments may be contemplated by one of skill in the art.

As also noted above, a basecutter assembly (or, generally, a "basecutter") of conventional design may be pivotally attached to the frame of a sugarcane harvester (or "harvester"). A spindle of the basecutter may extend toward the ground, with a set of cutting blades attached at to the spindle at the end opposite the harvester frame. A power source, such as a hydraulic motor, may be mounted to the frame (directly or indirectly) and configured to rotate the spindle, such that the power source may be utilized to rotate the set of blades along a cutting path. By pivoting the basecutters of a harvester relative to the frame, an operator may orient the cutting path of the blades at a desired height (or heights) from the ground. In this way, when the power source rotates the spindle, and the harvester drives along a field, the blades may continually cut sugarcane from the ground. Typically, a basecutter may include left- and right-side spindles, each supporting a set of cutting blades.

In some basecutters, in order to transport cut sugarcane plants into the feed train of the harvester, certain transport devices (or other additional features) may also be attached to (or formed integrally with) the spindle. In certain configurations, for example, carrying disks may be attached to the spindle to assist in moving cut sugarcane from the blades to the feed train. In known designs, the cutting blades may be mounted directly to a carrying disk, such that the blades are supported by the spindle via the carrying disk. As the carrying disks are rotated by the spindle, the blades may cut the sugarcane, and the cut ends of the sugarcane may be passed to (or otherwise engaged by) the carrying disks. The rotation of the carrying disks may then direct the cut ends of the sugarcane rearward toward a set of intake rollers or other initial elements of the harvester's feed train.

Additionally (or alternatively), various other transport devices may be attached to a basecutter spindle. Transport paddles, for example, also sometimes referred to as "kickers," may sometimes be attached to (or formed with) the spindle. Transport paddles may extend along the long axis of the spindle between the blades (or the carrying disks) and the harvester frame, and may also be configured to move cut sugarcane towards the feed train when the spindle rotates. For example, transport paddles may exhibit successive teeth, waved or stepped edges, or other geometry, extending outward from the spindle. Such features (e.g., teeth, waved edges, and so on) may contact the stalks and leaves of cut sugarcane and, through the spindle-driven rotation of the paddles, also direct the sugarcane rearward toward the feed train.

As noted above, the various transport devices for a conventional basecutter may be attached to a single spindle, along with the relevant set of cutting blades. (Also as noted above, two such spindles may be provided in a typical basecutter, such that right- and left-side sets of cutting blades may be used.) As such, during operation of the basecutter, the cutting blades and the transport devices may all rotate at the same speed. For example, in a basecutter with a left-side set of cutting blades, a left-side carrying disk and a left-side set of transport paddles, the blades, the disk and the paddles may all be supported by the same left-side spindle and, as such, may all be rotated at the cutting speed during operation of the basecutter. Likewise, a right-side carrying disk, set of transport paddles and set of cutting blades may also be supported by the same right-side spindle and may accordingly be uniformly rotated at the cutting speed.

It has been recognized, however, that uniform rotational speed for transport devices and cutting blades may not result in optimal cutting and transport of sugarcane. For example, in various conditions, the optimal rotational speed for cutting sugarcane plants may not be the optimal speed for transporting the cut sugarcane into the feed train of the harvester. As such, rotating the blades at an optimal cutting speed may result in decreased efficiency for the transport devices, and rotating the transport devices at an optimal transport speed may result in sub-optimal cutting.

In certain embodiments, accordingly, a dual function basecutter may be configured to rotate different components of the basecutter at different speeds. For example, a dual function basecutter may be configured to rotate cutting devices (e.g., blades) at one speed, and transport devices (e.g., carrying disks and transport paddles) at a different speed. In certain embodiments, a dual function basecutter may include a gearbox configured to receive rotational power from a power source such as one or more hydraulic (or other) motors. The gearbox may include at least two output interfaces, a first output interface for rotating a first spindle and a second output interface for rotating a second spindle. The gearbox and the motor (or motors) may be configured such that the gearbox transmits power from the motor(s) to rotate the first output interface at a first speed and to rotate the second output interface at a second, potentially different, speed. In this way, the firsts and second spindles, which engage the first and second output interfaces, may also be rotated at the first and second speeds.

In certain embodiments, the first spindle may be configured as a cutting spindle. For example, a set of cutting blades may be attached to the first spindle, such that rotating the first spindle rotates the cutting blades to cut sugarcane. As such the rotational speed at the first output interface of the gearbox may determine the rotational speed of the blades. Similarly, the second spindle may be configured as a transport spindle. For example, various transport devices such as transport paddles and carrying disks may be attached to the second spindle, such that rotating the second spindle rotates the transport devices. Accordingly, the rotational speed of the second output interface of the gearbox may determine the rotational speed of the transport devices. In this way, by rotating the two output interfaces of the gearbox at different speeds the cutting blades and the transport devices (e.g., the carrying disks and transport paddles) may be rotated at different speeds. For example, the cutting blades may be rotated at an optimal cutting speed and the transport devices may be rotated at a different optimal transport speed.

Other arrangements are also possible, through appropriate configuration of the various spindles and the gearbox. In certain embodiments, different transport devices may be attached to different spindles. For example, transport paddles for a dual function basecutter may be attached to a different spindle than carrying disks for the basecutter, such that the disks and paddles may be rotated at different speeds. Likewise, in certain embodiments, one or more transport devices may be attached to a cutting spindle, such that the transport devices rotate at the same speed as the cutting blades, and cutting blades (or other devices) may be attached to a transport spindle, such that the cutting blades (or other devices) rotate at the transport speed.

In certain embodiments, the cutting spindle and the transport spindle (or other spindles) may be disposed coaxially, such that both spindles are rotated by the gearbox about a common axis of rotation. One spindle, for example, may be configured with an internal, axially-extending bore, within which the other spindle may be disposed. The relevant gearbox, accordingly, may be configured with coaxially arranged output interfaces. In certain embodiments, a cutting spindle may be configured as the internal spindle and the transport spindle may be configured with the internal bore. This may be useful, for example, in allowing the cutting blades to be disposed below the transport devices (e.g., below the carrying disks and transport paddles).

In certain embodiments, a combined gearbox may be used for multiple sets of cutting blades and transport devices, as well as for multiple cutting and transport spindles. For example, a gearbox may be configured with two sets of output interfaces (e.g., two sets of coaxial interfaces). A left set of interfaces may be configured to drive a first cutting spindle and a first transport spindle, in order to separately rotate a right-side set of cutting blades and a right-side arrangement of transport paddles and carrying disks. Similarly, a right set of interfaces may be configured to drive a second cutting spindle and a second transport spindle, in order to separately rotate a left-side set of cutting blades and a left-side arrangement of transport paddles and carrying disks. In certain embodiments, such a gearbox may be configured to rotate the left- and right-side cutting spindles at the same speed, and to rotate and the left- and right-side transport spindles at the same speed. In certain embodiments, the left- and right-side spindles may be rotated independently.

In certain implementations, it may be useful to actively control the rotational speeds of particular spindles, in order to harvest sugarcane with greater efficiency. For example, a first hydraulic motor (or motors) may be provided for rotating the one or more transport spindles of a basecutter, and a second hydraulic motor (or motors) may be provided for rotating the one or more cutting spindles of the basecutter. The speed of the two hydraulic motors may be independently controlled in order to rotate the transport spindles and the cutting spindles, respectively, at independent speeds.

In certain implementations, the rotational speed of a cutting spindle may be controlled based upon the forward speed of the sugarcane harvester. This may be useful, for example, in order to ensure that sugarcane to be cut is first contacted by the cutting blades (rather than another feature of the basecutter), that the area between left- and right-side sets of cutting blades is fully covered by the rotating blades as the harvester travels along the field, and that the blades strike the sugarcane be cut with the leading edge of the blades. In the example configuration discussed above, for example, the output speed of the first motor, and thereby the rotational speed of the first output interface of the gearbox, may be controlled based upon a detected (or otherwise determined) wheel speed of the harvester. Various control strategies may be possible, including directly (or at least approximately) matching the speed of the first output interface to the ground speed of the vehicle, manual control (with or without suggested speeds), or automated control using look-up tables, process models, or other algorithmic tools.

In certain implementations, the rotational speed of a transport spindle may also (or alternatively) be controlled based upon the forward speed of the sugarcane harvester. This may be useful, for example, in order to ensure a steady and appropriately metered feeding of cut sugarcane plants into the feed train. In the example configuration discussed above, for example, the output speed of the second motor, and thereby the rotational speed of the second output interface of the gearbox, may be controlled based upon a detected (or otherwise determined) ground speed of the harvester. Various control strategies may be possible, including directly (or at least approximately) matching the speed of the second output interface to the ground speed of the vehicle, manual control (with or without suggested speeds), or automated control using look-up tables, process models, or other algorithmic tools.

Other factors may also be relevant to the control of rotational speed for the cutting (or transport) spindles, including the type of sugarcane being harvested, the current field configuration, the current field conditions, the number of cutting blades utilized, the angle of the cutting plane, and so on.

As will become apparent from the discussion herein, the disclosed dual function basecutter and basecutter control method may be used advantageously in a variety of settings and with a variety of machinery. In certain embodiments, referring now to FIG. 1, the disclosed system and method may be implemented with regard to a sugarcane harvester 20. It will be understood, however, that the disclosed basecutter and method may be used with various other platforms, including sugarcane harvesters of different configurations or designs than the sugarcane harvester 20 of FIG. 1.

The harvester 20 is presented in a side view in FIG. 1, with the front of the harvester 20 facing to the left. Accordingly, certain right-side components of the harvester 20 are not be visible in FIG. 1. The harvester 20 may include a cab 28 to seat an operator, as well as a frame 22, supporting various cutting, routing and processing devices. In certain embodiments, the frame 22 may be supported by a transport frame such as track frame 60 supporting track assemblies 24. Other harvesters may include wheels supported by axle assemblies (not shown). An engine 26 may supply power for driving the harvester along a field and for powering various driven components of the harvester 20. In certain embodiments, the engine 26 may directly power a main hydraulic pump (not shown). Various driven components of the harvester 20 may be powered by hydraulic motors (not shown) receiving hydraulic power from the main hydraulic pump via one or more hydraulic loops (not shown).

A cane topper 30 may extend forward of the frame 22 in order to remove the leafy tops of sugarcane plants (not shown), and a set of crop dividers (e.g., left-side divider 32 shown in FIG. 1) may guide the remainder of the sugarcane toward internal mechanisms of the harvester 20 for processing. As the harvester 20 moves across a field, plants passing between the crop dividers 32 may be deflected downward by a knockdown roller 36 before being cut near the base of the plants by one or both of basecutters 34 and 38. The crop dividers 32 and the basecutters 34 and 38 may be supported by the frame 22 in various ways. For example, the basecutters 34 and 38 may be pivotally mounted to the frame 22, such that the basecutters 34 and 38 may be independently oriented at particular angles (and with particular cutting heights) with respect to the ground.

Rotating disks, guides, paddles (not shown in FIG. 1) or other transport devices on either of the basecutters 38 and 34 may direct the cut ends of the plants upwardly and rearward within the harvester 20 toward a feed train 40 of the harvester 20, which may include successive pairs of upper and lower feed rollers 42 and 44 supported by the frame 22. A set of intake rollers 42a and 44a may accordingly be configured receive cut sugarcane from the basecutters 38 and 34 at the front end of feed train 40. The feed rollers 40 and 42 may be rotated (e.g., by various hydraulic motors) in order to convey the received sugarcane toward chopper drums 46 and 48 for chopping into relatively uniform billets. The sugarcane may then be cleaned by a primary extractor 50, and carried up a loading elevator 52 for discharge into a trailing truck or other receptacle (not shown).

In certain embodiments, one or more control devices, such as controller 60, may be included in (or otherwise associated with) the harvester 20. The controller 60, for example, may include one or more computing devices including various processor devices and various associated memory architectures. In certain embodiments, the controller 60 may additionally (or alternatively) include various other control devices such as various hydraulic valves and hydraulic circuits, various electronic control circuits and devices (e.g., various power electronics devices), and so on. In certain embodiments, the controller 60 (or another control device) may be in communication with various switches, controls and other interfaces or input devices (not shown) in the cab 18, as well as with various sensors, actuators, or other devices distributed throughout the harvester 20. For example, the controller 60 may be in communication with a wheel speed sensor 62, an engine speed sensor 64, or other devices. The controller 60 may also be in communication with various hydraulic (or other) motors or other power sources (not shown in FIG. 1) for operating the basecutters 34 and 38. In certain embodiments, the controller 60 (or another control device) may be a remotely located from the harvester 20 and may communicate with various devices and systems of the harvester 20 via wireless or other communication means.

Figure 2:
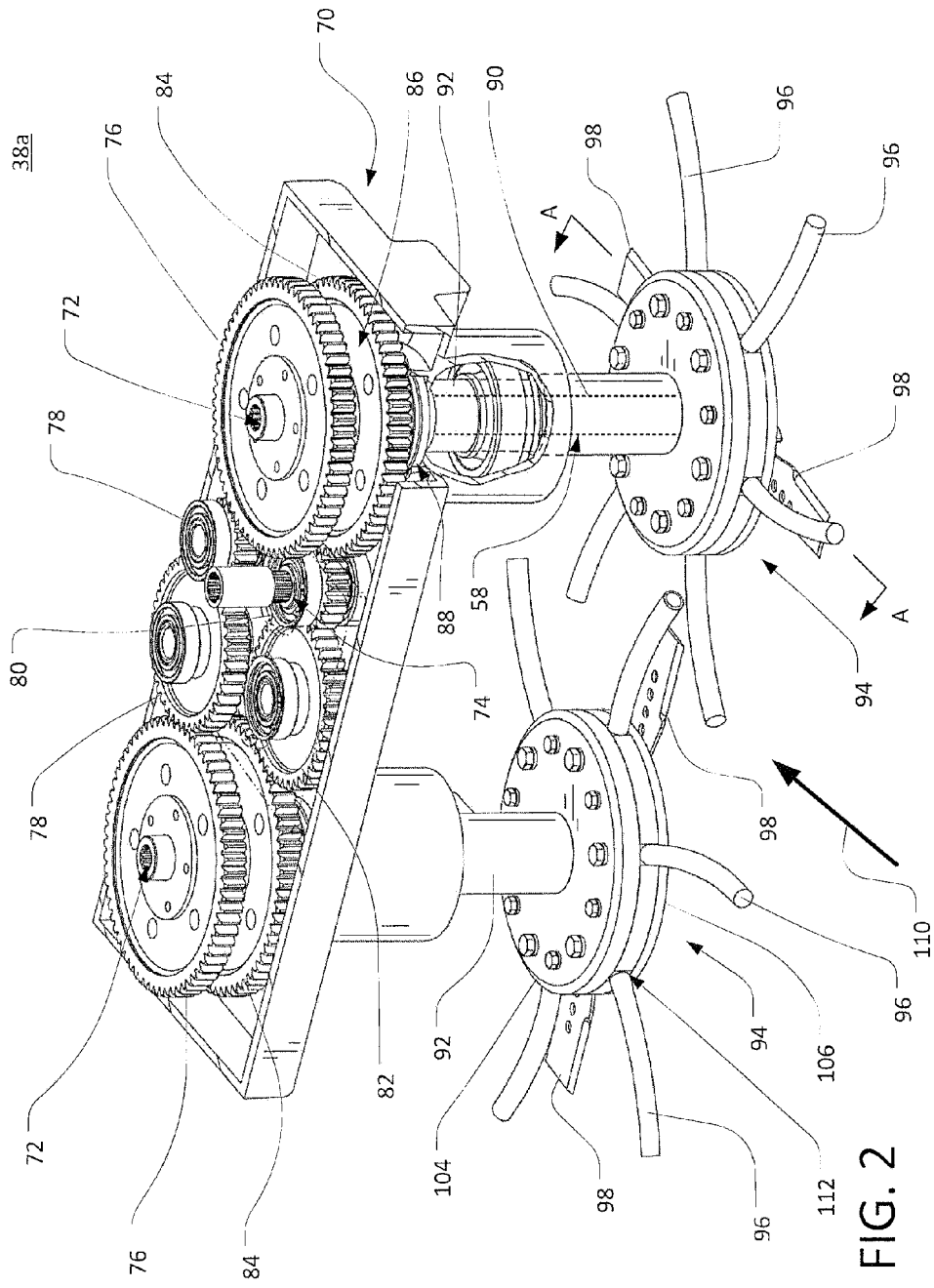
FIG. 2 is a perspective view of an example basecutter for the sugarcane harvester of FIG. 1.

Referring also to FIG. 2, an example configuration of the basecutter 38 is depicted as basecutter 38a. (It will be understood that similar configuration of the basecutter 34 may also be possible.) The basecutter 38a includes a gearbox 70, with input interfaces 72 and 74. As depicted, the input interfaces 72 and 74 are splined female connectors, each configured to receive the output shaft of a hydraulic motor (or other power source) (not shown in FIG. 2). Other configurations of the input interfaces 72 and 74 may be possible, however. Similarly, a different number of input interfaces may be provided. For example, only one of the input interfaces 72 may be included in certain embodiments.

The input interface 74 is configured such that rotational power received at the interface 74 (e.g., from one or more different hydraulic motors) causes the input gear 80 to rotate. The gear 80, in turn, rotates one main gear 84 directly and one main gear 84 via a timing gear 82. Each of the main gears 84 is connected to an output interface 88 (e.g., another splined female connector). A transport spindle 92 (shown in dotted outline in FIG. 2) engages the output interface 88 such that rotation of the output interface 88 rotates the transport spindle 92. (Only the right-side output interface 88 is shown in FIG. 2.) A carrying disk 94 is attached to each transport spindle 92 opposite the gearbox 70.

In this way, the transport spindles 92 and, thereby, the carrying disks 94 may be rotated by providing rotational input at the input interface 74. In the configuration depicted, due to the depicted configuration of the timing gear 82, the carrying disks 94 for the two transport spindles 92 may generally rotate at the same speed. In certain embodiments, however, the gearbox 70 may be configured such that the carrying disk 94 of one transport spindle 92 may be rotated at a different speed than the carrying disk 94 of the other transport spindle 92.

The input interfaces 72 are configured such that rotational power received at the input interfaces 72 (e.g., from one or more hydraulic motors) causes the main gears 76 to rotate. In the embodiment depicted, timing gears 78 are provided to ensure that the main gears 76 rotate at the same speed. In certain embodiments, however, the gears 76 (or the input interfaces 72) may be configured to rotate at different speeds. Each of the input interfaces 72 is connected (e.g., via the main gears 76) to an output interface 86 (e.g., another splined female connector).

A cutting spindle 90 extends within a bore 58 through the transport spindle 92, such that the cutting spindle 90 may rotate within, and relatively independently of, the transport spindle 92. The cutting spindle engages the output interface 86 such that rotation of the output interface 86 rotates the cutting spindle 90. A set of cutting blades 98 is attached to each cutting spindle 90 opposite the gearbox 70. (Only the right-side cutting spindle 90, along with various associated components, is shown in FIG. 2.)

In the embodiment depicted in FIG. 2, the cutting spindles 90 and, thereby, the cutting blades 98, may be rotated by providing rotational input at one or both of the input interfaces 72. In the configuration depicted, due to the timing gears 78, the cutting blades 98 for the two cutting spindles 90 may generally rotate at the same speed. In certain embodiments, however, the gearbox 70 may be configured such that the cutting blades 98 of one cutting spindle 90 may be rotated at a different speed than the cutting blades 98 of the other cutting spindle 90 (not shown in FIG. 2).

With the cutting spindles 90 extending within the bores 58 through the transport spindles 92, the cutting spindles 90 may be rotated at different speeds and in different directions from the transport spindles 92. For example, a first powered input at the input interface 72 may cause the cutting spindles 90 to rotate at a first speed, and a second powered input at the input interface 74 may cause the transport spindles 92 to rotate at a second, different speed. In certain embodiments, the cutting spindles 90 and transport spindles 92 may additionally (or alternatively) be rotated in opposite directions.

In certain embodiments, a sleeve 56 or other structure may extend from the gearbox 70 in order to further support the relatively independent rotation of the spindles 90 and the spindles 92. In certain embodiments, a plate or shield (not shown) may be positioned between the gears for driving the cutting spindle 90 (e.g., one or more of the gears 76 and 78) and the gears for driving the transport spindle 92 (e.g., the gears 80, 82, and 84). This may be useful, for example, to avoid interference between the sets of gears when the spindles 90 and 92 are being rotated at different speeds (or in different directions).

Still referring to the embodiment depicted in FIG. 2, the carrying disks 94 each support a plurality of transport spokes 96, which generally extend radially away from the carrying disks 94. The spokes 96 are depicted as generally tubular members, although other configurations may be possible, including flattened spokes, square or rectangular spokes, and so on.

Also as depicted, the spokes 96 are curved such that as the carrying disks 94 rotate to carry sugarcane in a feed direction 110 between the two transport spindles 92 (i.e., towards the intake feed rollers 42a and 44a, as depicted in FIG. 1) the spokes 96 curve away from the direction of motion. In certain embodiments, the spokes 96 may instead curve in the opposite direction from that depicted in FIG. 2. This latter configuration, for example, may be useful if the cutting blades 98 and the spokes 96 are to be rotated in the opposite directions from each other. In certain embodiments, for example, the spokes 96 may be rotated to feed cut sugarcane along the feed direction 110 between the two transport spindles 92, and the cutting blades 98 may be rotated in an opposite direction. In such a case, curvature of the spokes 96 in the direction of the rotation of the transport spindles 92 may act to counterbalance the force of the cutting blades 98, which may tend to urge cut sugarcane opposite the feed direction 110. The spokes 96 may be configured from a variety of materials, and may be configured as rigid elements, or as flexible elements, and so on.

Various alternative configurations for the gearbox 70 may also be possible. For example, an alternative gearbox may include one or more clutches or other control devices, which may be controlled (e.g., by the controller 60) to change the effective gear ratio between the input interfaces 72 and 74 and the various spindles 90 and 92. As such, for example, the gearbox may be utilized to change the rotational speed for one or more of the spindles 90 and 92 for a given input speed at the relevant input interface 72 or 74. Generally, even a fixed-gear gearbox such as the gearbox 70 may be configured to impose any desired gear ratio between the input interfaces 72 and 74 and the spindles 90 and 92, respectively.

In order to facilitate rotation of the transport spindles 92 at different speeds than the cutting spindles 90, one of the spindles 92 or 90 may be generally configured to rotate within the other of the spindles 92 or 90. For example, as depicted in FIG. 2, each of the transport spindles 92 is configured with a bore 58 extending axially along the spindles 92. The cutting spindles 90 are nested within the respective bore 58 of the associated transport spindle 92, such that the cutting spindles 90 generally rotate within the bores 58. Further, the cutting spindles 90 extend upward through the relevant main gear 84 in order to receive rotational power from the main gears 76 (and the input interfaces 72). In this way, rotational power from the input interfaces 72 may drive the cutting spindles 90 at a first speed and rotational power from the input interface 74 may drive the transport spindles 92 at a second, potentially different, speed. Indeed, in certain embodiments, the cutting spindles 90 (and, thereby, the cutting blades 98) may be rotated in the opposite direction from the transport spindles 92 (and, thereby, the relevant transport device). In the embodiment depicted in FIG. 2, for example, the transport spokes 96 may be rotated to carry cut sugarcane between the transport spindles 92 along the feed direction 110, and the cutting blades 98 may be rotated such that the blades 98 travel opposite the feed direction 110 when passing between the two spindles 90. This may be useful, for example, in order to reduce the dirt, stones, and other trash that may be directed (e.g., thrown) by the cutting blades 98 into the feed train of the harvester 20.

Rotating the cutting blades 98 and the transport spokes 96 (or other transport devices) at different speeds may provide various additional benefits. For example, when the rotational speed of the cutting blades 98 is identical to the rotational speed of the transport spokes 96, rotating the cutting blades 98 with sufficient speed to effectively cut sugarcane (e.g., at speeds of 600 rpm or higher) may result in poor feeding of cut sugarcane into the feed train by the transport spokes 96. Likewise, rotating the transport spokes 96 with appropriate speed to effectively route sugarcane into the feed train may result in poor cutting of the sugarcane by the cutting blades 98. Accordingly, by rotating the spokes 96 and the blades 98 at different speeds, more optimal cutting and feeding may be achieved.

As another benefit, because the rotational speed of the cutting spindle 90 may be elevated without also elevating the speed of the transport spindle 92, significantly higher cutting speeds for the blades 98 may be achieved (e.g., speeds of 1500 rpm or higher). Further, because elevated cutting speeds may be obtained without detrimental effect on feeding of cut sugarcane into the feed train, a fewer number of blades 98 may be utilized than in known configurations. As depicted in FIG. 2, for example, only two blades 98 may be required for each cutting spindle 90 in order to effectively cut sugarcane from the ground.

Figure 3:
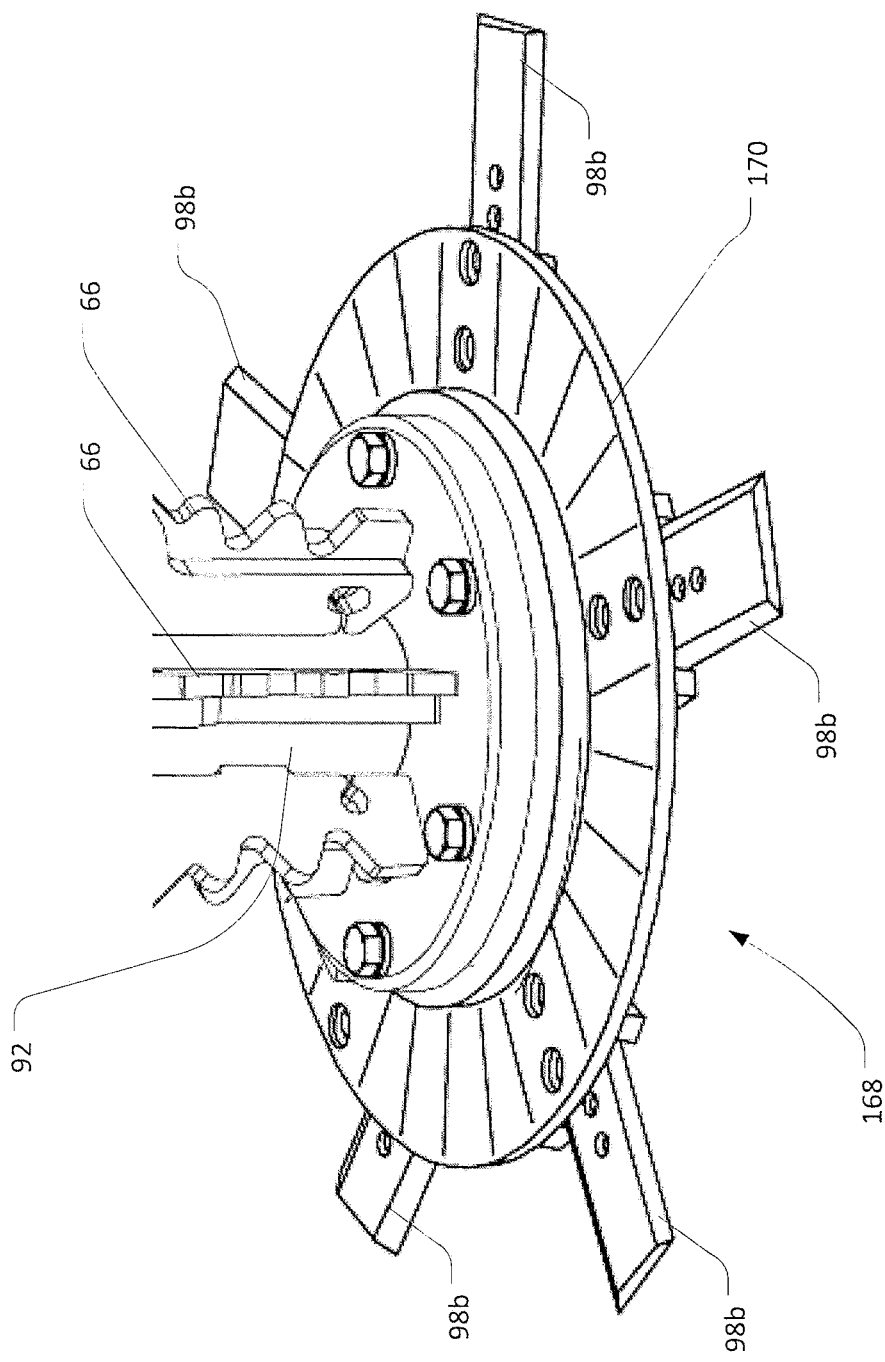
FIG. 3 is an enlarged perspective view of alternative configuration of cutting blades for the basecutter of FIG. 2.

In other embodiments, a different number of the cutting blades may be utilized. Referring also to FIG. 3, for example, the cutting spindle 90 may be attached to a cutting disk 168, and a plate 170 of the cutting disk 168 may be configured to support a plurality (e.g., 5 or more) of cutting blades 98*b*. In contrast to the embodiment of FIG. 2, the embodiment depicted in FIG. 3 also exhibits various transport paddles 66 for routing cut sugarcane into the feed train 40.

Figure 4A:
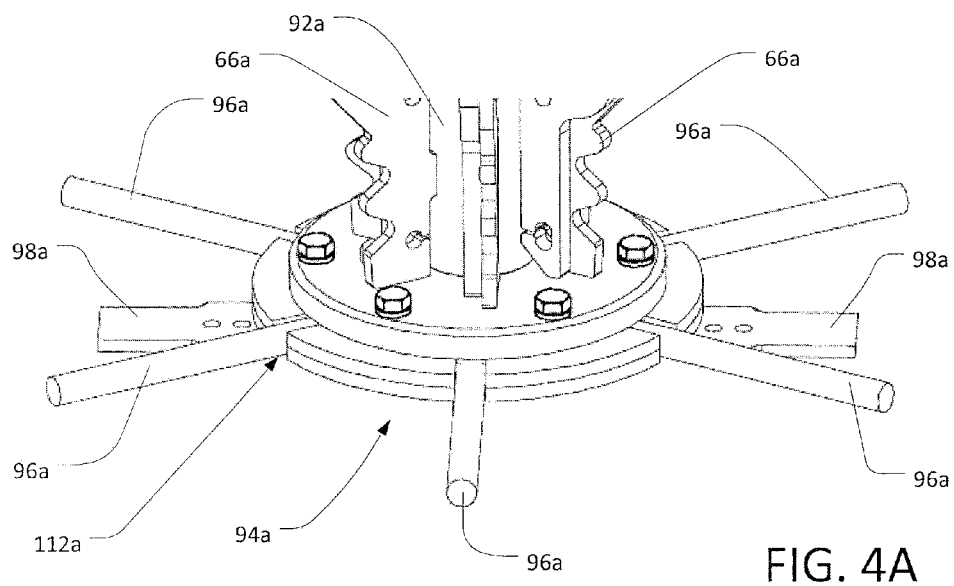
FIGS. 4A and 4B are enlarged perspective views of alternative configurations of the basecutter of FIG. 2.
Figure 4B:
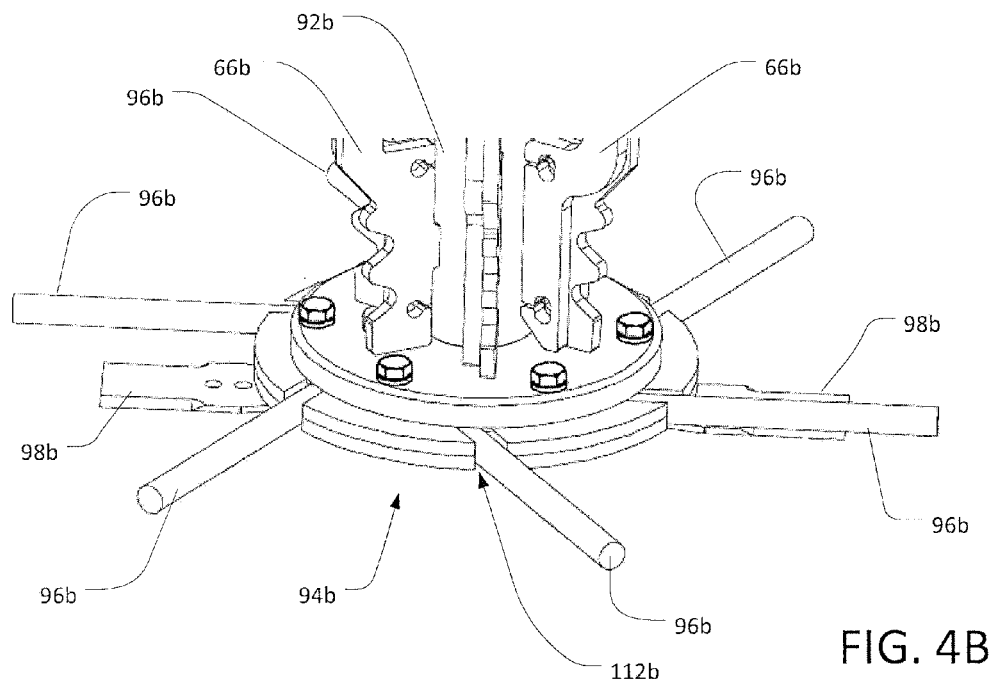

In certain embodiments, as noted above, transport spokes may be oriented differently than depicted in FIG. 2. Referring to FIG. 4A, for example, various transport spokes 96*a* may be configured with little or no curvature, and may extend only in a substantially radial direction outward from a carrying disk 94*a*. Referring to FIG. 4B, in certain embodiments, transport spokes 96*b* may be attached to carrying disk 94*b* at an angle to radial direction of the disk 94*b*. (It will be understood that the spokes 96*b* still extend at least partly in the radial direction, such that the spokes 96*b* can interact with sugarcane that is radially removed from the carrying disk 94*b*.) In the embodiment depicted in FIGS. 4A and 4B, the transport spokes 96*a* and 96*b* are configured with little or no curvature. In certain embodiments, the spokes 96*a* or 96*b* may be curved to varying degrees (e.g., as depicted for the transport spokes 96 in FIG. 2). The embodiments depicted in FIGS. 4A and 4B also include transport paddles 66*a* and 66*b*, respectively, which may be attached to the transport spindles 92*a* and 92*b*. In other embodiments, other transport devices may additionally (or alternatively) be used.

Figure 5:
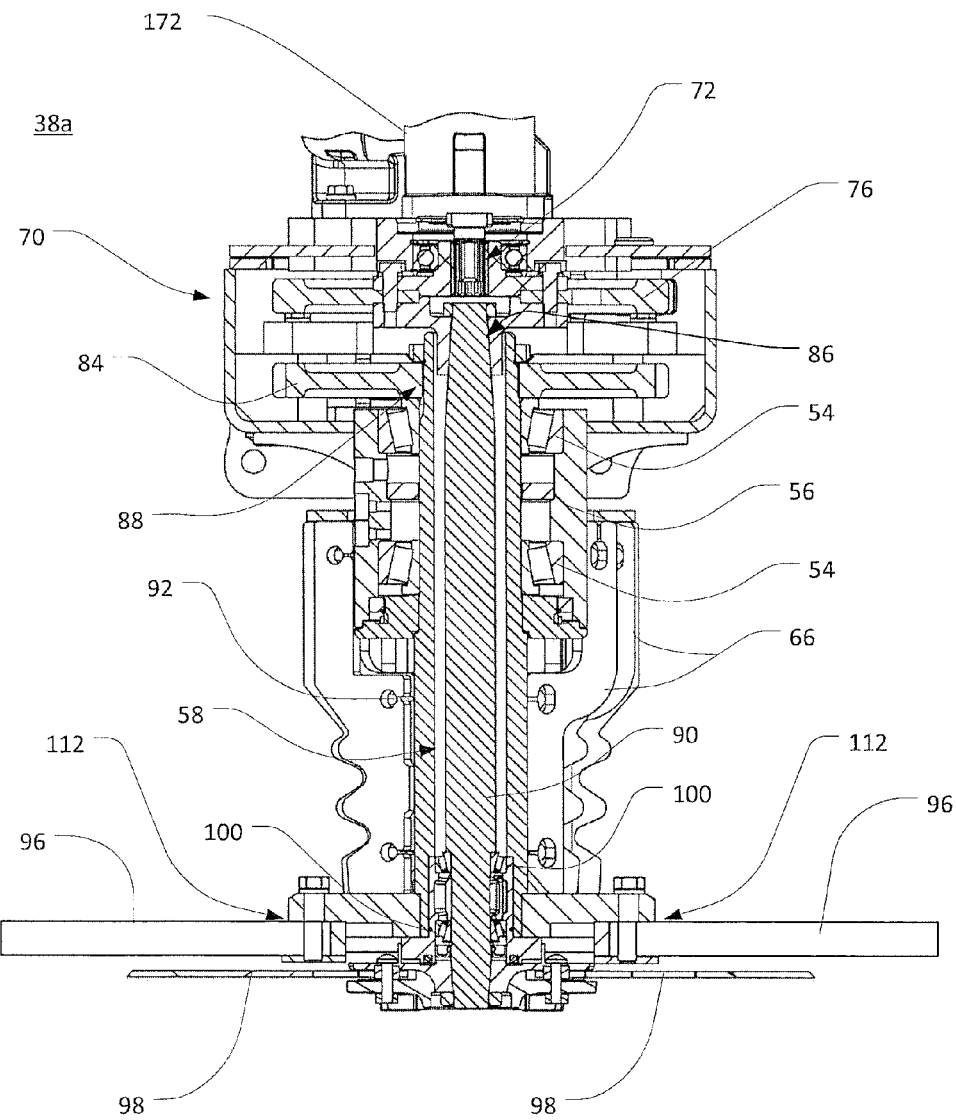
FIG. 5 is a cross-sectional view of the basecutter of FIG. 2, taken along plane A-A of FIG. 2.
Figure 6:
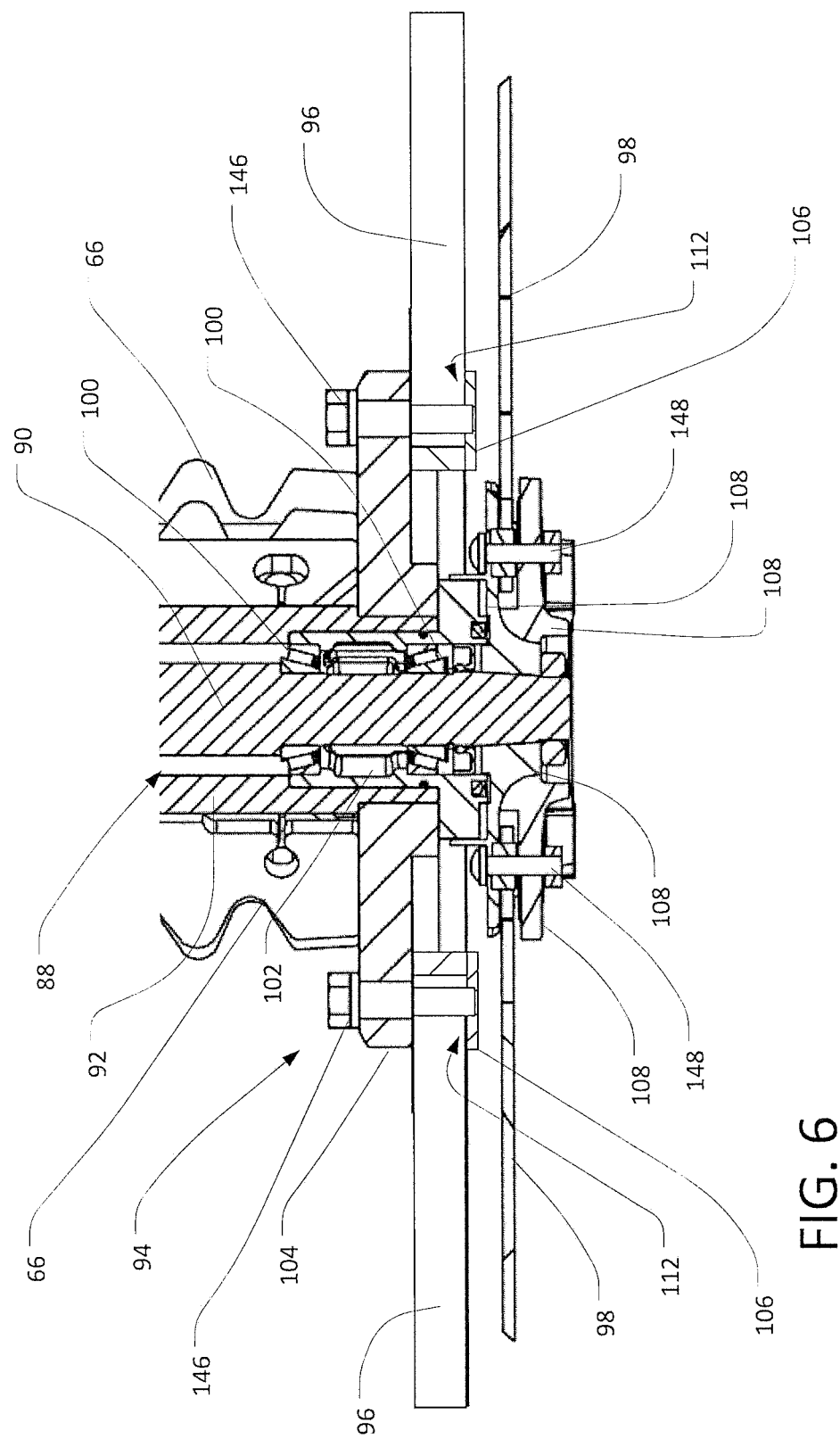
FIG. 6 is an enlarged cross-sectional view of the basecutter of FIG. 2, taken from the same perspective as FIG. 5.

Referring also to FIGS. 5 and 6, an example configuration is depicted for supporting the spindles 90 and 92 with respect to each other and the gearbox 70, and for attaching the blades 98 and the spokes 96 to the spindles 90 and 92, respectively. The basecutter 38*a* is depicted, in FIGS. 5 and 6, with various transport paddles 66 attached to the transport spindle 92. Also as depicted in FIG. 5, the output shaft of a motor 172 is engaged with the gear 76 at the input interface 72. It will be understood that other configurations may be possible.

As can be seen in the embodiment depicted in FIG. 5, the output interface 86 may be configured as a sleeve extending from the gear 76, with a somewhat conical, splined (or other) interface for engaging a tapered end of the cutting spindle 90. It will be understood, however, that other configurations are possible. Similarly, in the embodiment depicted, the output interface 88 may be configured as bore through the gear 84, with a splined (or other) interface for engaging an outer surface of the transport spindle 92. As noted above, the spindle 90 may be supported for rotation by various bearings 54 fixed to a sleeve 56 extending from the gearbox 70. Additional bearings 100 (see also FIG. 6) may also be utilized, to allow independent rotation of the spindles 90 and 92.

As noted above, the cutting spindle 90 generally extends along the bore 58 within the transport spindle 92. (As also noted above, alternative embodiments may be possible in which a transport spindle extends along a bore within a cutting spindle.) Two bearings 100 are attached to the cutting spindle 90 at the end of the cutting spindle 90 near the cutting blades 98. The bearings 100 are also attached to the transport spindle 92, such that the cutting spindle 90 may freely rotate within the transport spindle 92. As depicted, for example, a sleeve 102 is attached to the transport spindle 92 within the bore 58 and the bearings 100 are seated on the sleeve 102. It will be understood, however, that other configurations may be possible. Further, other bearing arrangements (not shown) may be provided at other locations within the bore 58 (or otherwise) in order to allow relatively independent rotation of the two spindles 90 and 92.

In order to attach the transport spoke 96 (or other transport devices) to the transport spindle 92, the carrying disk 94 is attached to the transport spoke 96 (see also FIG. 2). The carrying disk 94 is configured to include an upper plate 104 and a lower plate 106. Various channels 112 or other features are included in one (or both) of the plates 104 and 106, and the radially inner ends of the various transport spokes 96 are seated, respectively, within the channels 112. Bolts or other devices are then utilized to secure the spokes 96 within the channels 112. As depicted, for example, bolts 146 extend through the upper and lower plates 104 and 106 and the various spokes 96 in order to secure the spokes 96 to the carrying disk 94. Other configurations may also be possible. For example, the spokes 96 may be directly attached to the transport spindle 92 or to another feature, rather than to the carrying disk 94 (or another carrying disk). Similar channels 112*a* and 112*b* may be utilized to secure other transport devices (e.g., the transport spokes 96*a* and 96*b*, respectively) to the carrying disks 94*a* and 94*b* (see FIGS. 4A and 4B)

Also as depicted, the cutting blades 98 are secured to the cutting spindle 90 with two centrally disposed yokes 108. The radially inner ends of the blades 98 extend between the upper and lower yokes 108 and are secured to the yokes with bolts 148. With the yokes 108 attached to the cutting spindle 90, the blades 98 are accordingly configured to be rotated by the rotation of the cutting spindle 90. Again, other configurations may also be possible, including configurations with different numbers of cutting blades, different attachment mechanisms for securing the blades to the relevant spindle, and so on.

Figure 7:
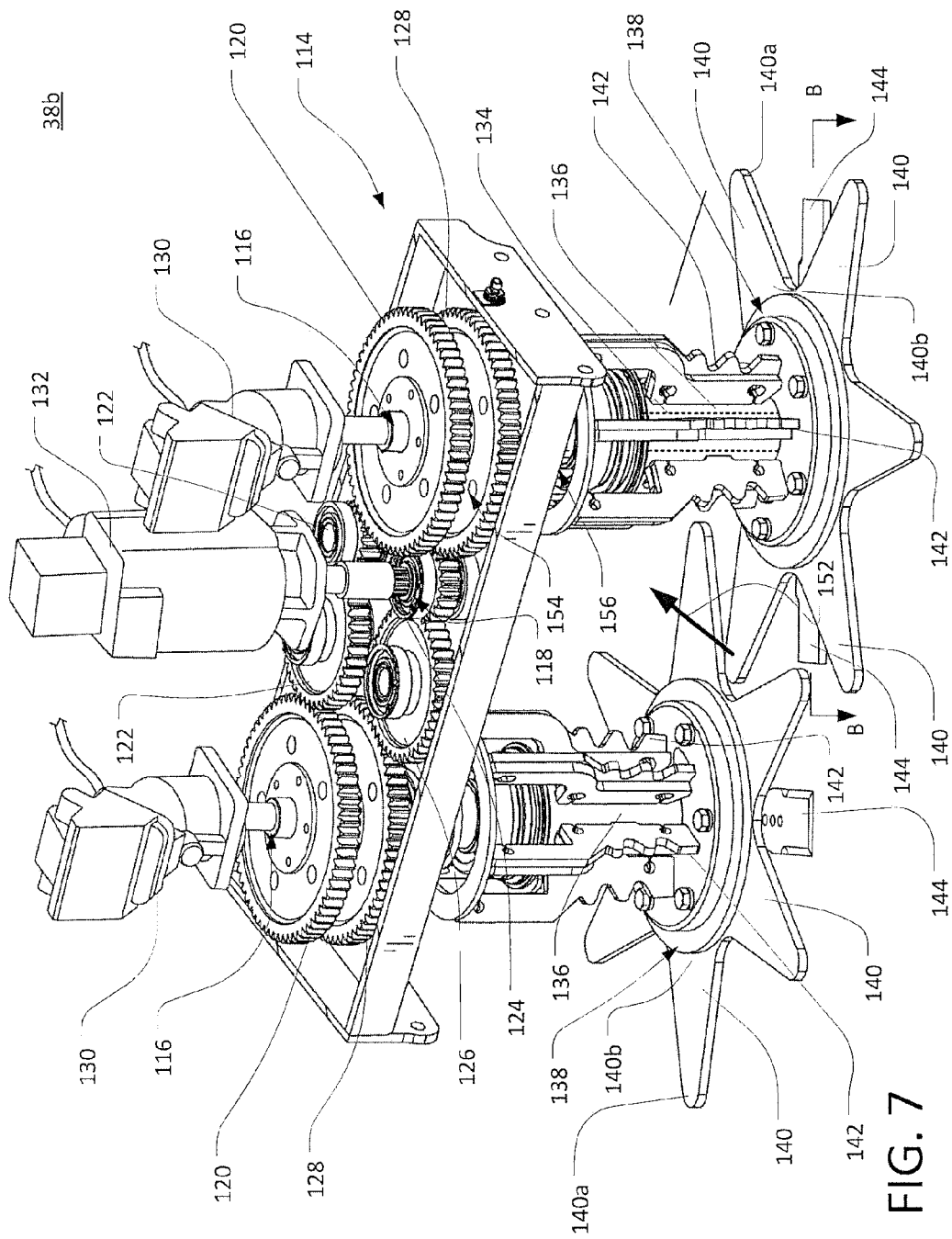
FIG. 7 is a perspective view of another example basecutter for the sugarcane harvester of FIG. 1.

In certain embodiments, as also noted above, various transport devices other than (or in addition to) the carrying disks 94 may be utilized. Referring also to FIG. 7, for example, another example configuration of the basecutter 38 is depicted as basecutter 38*b*. (It will be understood that similar configuration of the basecutter 34 may also be possible.) The basecutter 38*b* includes a gearbox 114, with input interfaces 116 and 118. As depicted, the input interfaces 116 and 118 are splined female connectors, each configured to receive the output shaft of a hydraulic motor. As depicted, for example, hydraulic motors 130 are engaged with the input interfaces 116 and a hydraulic motor 132 is engaged with the input interface 118. Other configurations of the input interfaces 116 and 118 and the motors 130 and 132 may be possible. For example, the input interfaces 116 and 118 may include bolt-on or other connectors rather than splined connectors, or electrical motors (or other power sources) may be provided rather than the hydraulic motors 130 and 132. Similarly, a different number of input interfaces or motors may be provided. For example, only one of the input interfaces 116 or only one of the motors 130 may be included in certain embodiments.

The motors 130 and 132 may be configured in various ways. In certain embodiments, the motors 130 and 132 may be directly controlled in order to vary the speed of the motors 130 and 132 during operation of the basecutter 38*b*. For example, the controller 60 may be configured to directly command a particular output speed from one or more of the various motors 130 and 132. In certain embodiments, a separate device may be controlled in order to indirectly control the motors 130 and 132. For example, the controller 60 may be configured to control a first variable displacement pump (not shown) in order to control the rotational speed of the output shaft of the motors 130, and to control a second variable displacement pump in order to control the rotational speed of the output shaft of the motor 132.

The input interfaces 116 are configured such that rotational power received at the interfaces 116 (e.g., from the hydraulic motors 130) causes the main gears 120 to rotate. In the embodiment depicted, timing gears 122 are provided to ensure that the main gears 120 rotate at the same speed. In certain embodiments, however, the gears 120 (or the interfaces 116) may be configured to rotate at different speeds. Each of the input interfaces 116 is connected (e.g., via the main gears 120) to an output interface 154 (e.g., another splined female connector). A cutting spindle 134 engages the output interface 154 such that rotation of the interface 154 rotates the cutting spindle 134, and a set of cutting blades 144 is attached to each cutting spindle 134 opposite the gearbox 114. (Only the right-side cutting spindle 134, along with various associated components, is shown in FIG. 7.)

In this way, the cutting spindles 134 and, thereby, the cutting blades 144, may be rotated by providing rotational input at one or both of the input interfaces 116 (e.g., with the motors 130). In the configuration depicted, due to the depicted configuration of the timing gears 122, the cutting blades 144 for the two cutting spindles 134 may generally rotate at the same speed. In certain embodiments, however, the gearbox 114 may be configured such that the cutting blades 144 of one cutting spindle 134 may be rotated at a different speed than the cutting blades 144 of the other cutting spindle 134 (not shown in FIG. 7).

The input interface 118 is configured such that rotational power received at the interface 118 (e.g., from the hydraulic motor 132) causes the input gear 124 to rotate. The gear 124, in turn, rotates one main gear 128 directly and one main gear 128 via a timing gear 126. Each of the main gears 128 is connected to an output interface 156 (e.g., another splined female connector). A transport spindle 136 engages the output interface 156 such that rotation of the interface 156 rotates the transport spindle 136, and a carrying disk 138 is attached to each transport spindle 136 opposite the gearbox 114. (Only the right-side output interface 156 is shown in FIG. 7.) In this way, the transport spindles 136 and, thereby, the carrying disks 138 may be rotated by providing rotational input at the input interface 118. In the configuration depicted, due to the timing gear 126, the carrying disks 138 for the two transport spindles 136 may generally rotate at the same speed. In certain embodiments, however, the gearbox 114 may be configured such that the carrying disk 138 of one transport spindle 136 may be rotated at a different speed than the carrying disk 138 of the other transport spindle 136.

As depicted, the carrying disks 138 each include a plurality of transport arms 140, which generally extend radially away from the transport spindles 136. As depicted, the arms 140 are integrally formed with the carrying disk 138, exhibit a smaller width at the tips 140*a* of the arms 140 than at the bases 140*b* of the arms 140, and exhibit little or no curvature away from the radial direction (from the perspective of the transport spindles 136). In certain embodiments, the arms 140 may instead extend radially outward with varying amounts of curvature, may exhibit other widths at the tips 140a and the bases 140b of the arms 140, or may be formed separately from the carrying disk 138 (e.g., may be bolted onto the disk 138). Similarly, in certain embodiments, the arms 140 may be directly connected to the transport spindle 136.

Figure 8:
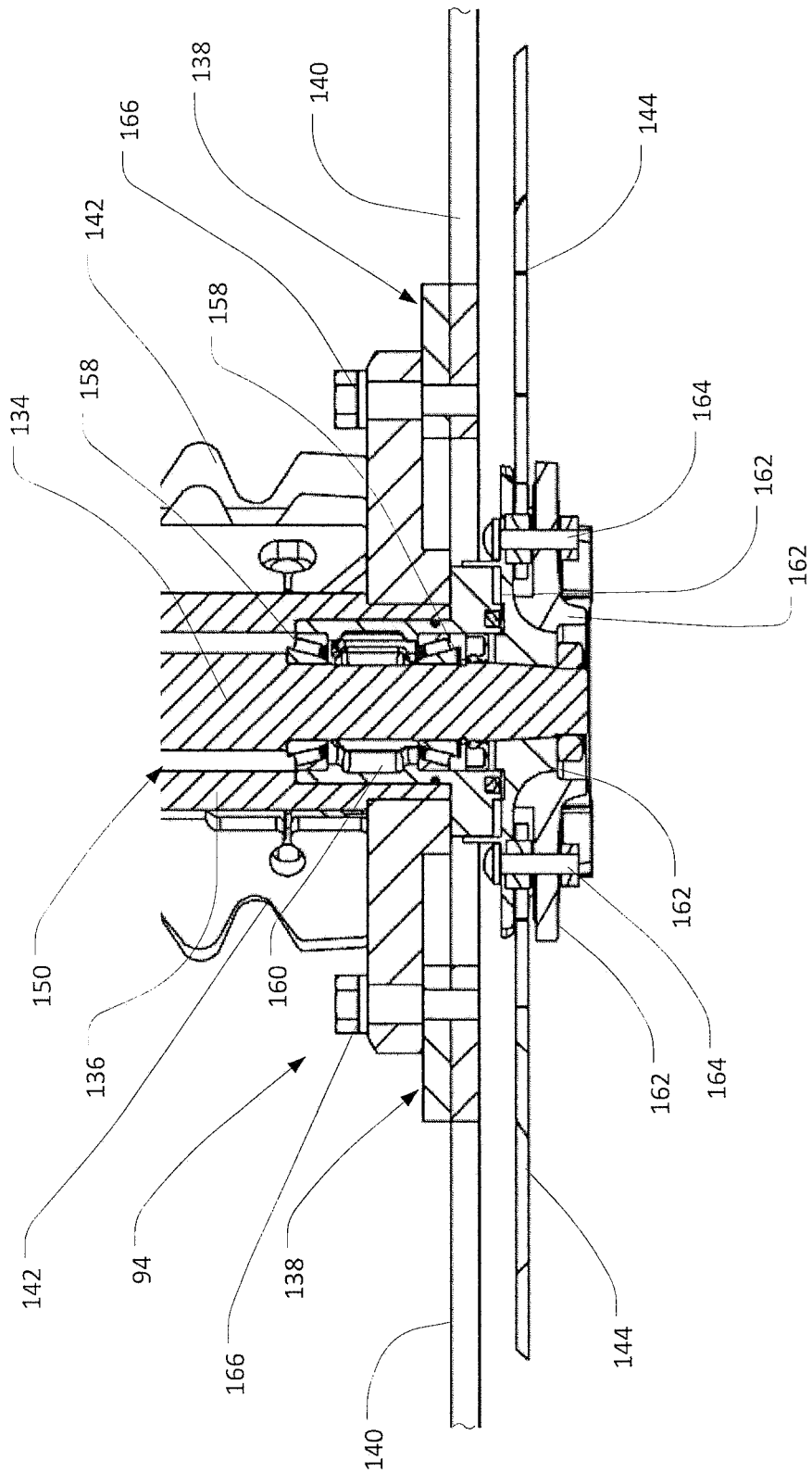
FIG. 8 is an enlarged cross-sectional view of the basecutter of FIG. 7, taken along plane B-B of FIG. 7.

In the embodiment depicted, referring also to FIG. 8, the transport arms 140 are attached to the carrying disk 138 with various bolts 166. Other configurations may also be possible. For example, the arms 140 may be directly attached to the transport spindle 136 or to another feature, rather than to the carrying disk 138 (or another carrying disk). Various bearings 158 are also attached to the transport spindle 136, such that the cutting spindle 134 may freely rotate within the transport spindle 136.

Also as depicted, the cutting blades 144 are secured to the cutting spindle 134 with two centrally disposed yokes 162. The radially inner ends of the blades 144 extend between the upper and lower yokes 162 and are secured to the yokes with bolts 148. With the yokes 162 attached to the cutting spindle 134, the blades 144 are accordingly configured to be rotated by the rotation of the cutting spindle 134. Again, other configurations may also be possible, including configurations with different numbers of cutting blades, different attachment mechanisms for securing the blades to the relevant spindle, and so on.

Referring again to FIG. 7, various alternative configurations for the gearbox 114 may also be possible. For example, an alternative gearbox may include one or more clutches or other control devices, which may be controlled (e.g., by the controller 60) to change the effective gear ratio between the input interfaces 116 and 118 and the various spindles 134 and 136. As such, for example, the gearbox may be utilized to change the rotational speed for one or more of the spindles 134 and 136 for a given input speed at the relevant input interface 116 or 118. Generally, even a fixed-gear gearbox such as the gearbox 114 may be configured to impose any desired gear ratio between the input interfaces 116 and 118 and the spindles 134 and 136, respectively.

Generally, in order to facilitate rotation of the transport spindles 136 at different speeds than the cutting spindles 134, one of the spindles 136 or 134 may be configured to rotate within the other of the spindles 136 or 134. For example, as depicted in FIG. 7, each of the transport spindles 136 is configured with a bore 150 extending axially along the spindles 136. The cutting spindles 134 are nested within the respective bore 150 of the associated transport spindle 136, such that the cutting spindles 134 generally rotate within the bores 150. Further, the cutting spindles 134 extend upward through the relevant main gear 128 in order to receive rotational power from the main gears 120 (and the input interfaces 116). In this way, rotational power from the input interfaces 118 may drive the cutting spindles 134 at a first speed and rotational power from the input interface 116 may drive the transport spindles 136 at a second, potentially different, speed. Indeed, in certain embodiments, the cutting spindles 134 (and, thereby, the cutting blades 144) may be rotated in the opposite direction from the transport spindles 136 (and, thereby, the relevant transport device). In the embodiment depicted in FIG. 7, for example, the transport arms 140 may be rotated to carry cut sugarcane between the transport spindles 136 along the feed direction 152, and the cutting blades 144 may be rotated such that the blades 144 travel against the feed direction 152 when passing between the two spindles 136.

In certain implementations, pressure control for movement of a header may be implemented as part of a basecutter control ("BC") method such as BC method 200. The BC method 200 may be represented as various instruction sets and subroutines stored on a storage device forming part of (or otherwise coupled to) the controller 60, and may be executed by one or more processors and one or more memory architectures (e.g., as included in or associated with the controller 60). In certain implementations, the BC method 200 may be a stand-alone method. In certain implementations, the BC method 200 may operate as part of, or in conjunction with, one or more other methods or processes and/or may include one or more other methods or processes. Likewise, in certain implementations, the BC method 200 may be represented and implemented by an entirely hardware-based configuration or as a hydraulically or mechanically operated control structure, in addition or as an alternative to a configuration having the BC method 200 as a set of instructions stored in a storage device (e.g., a storage device included in or associated with the controller 60). For the following discussion, the BC method 200 will be described for illustrative purposes. It will be understood, however, that other implementations may be possible.

Figure 9:
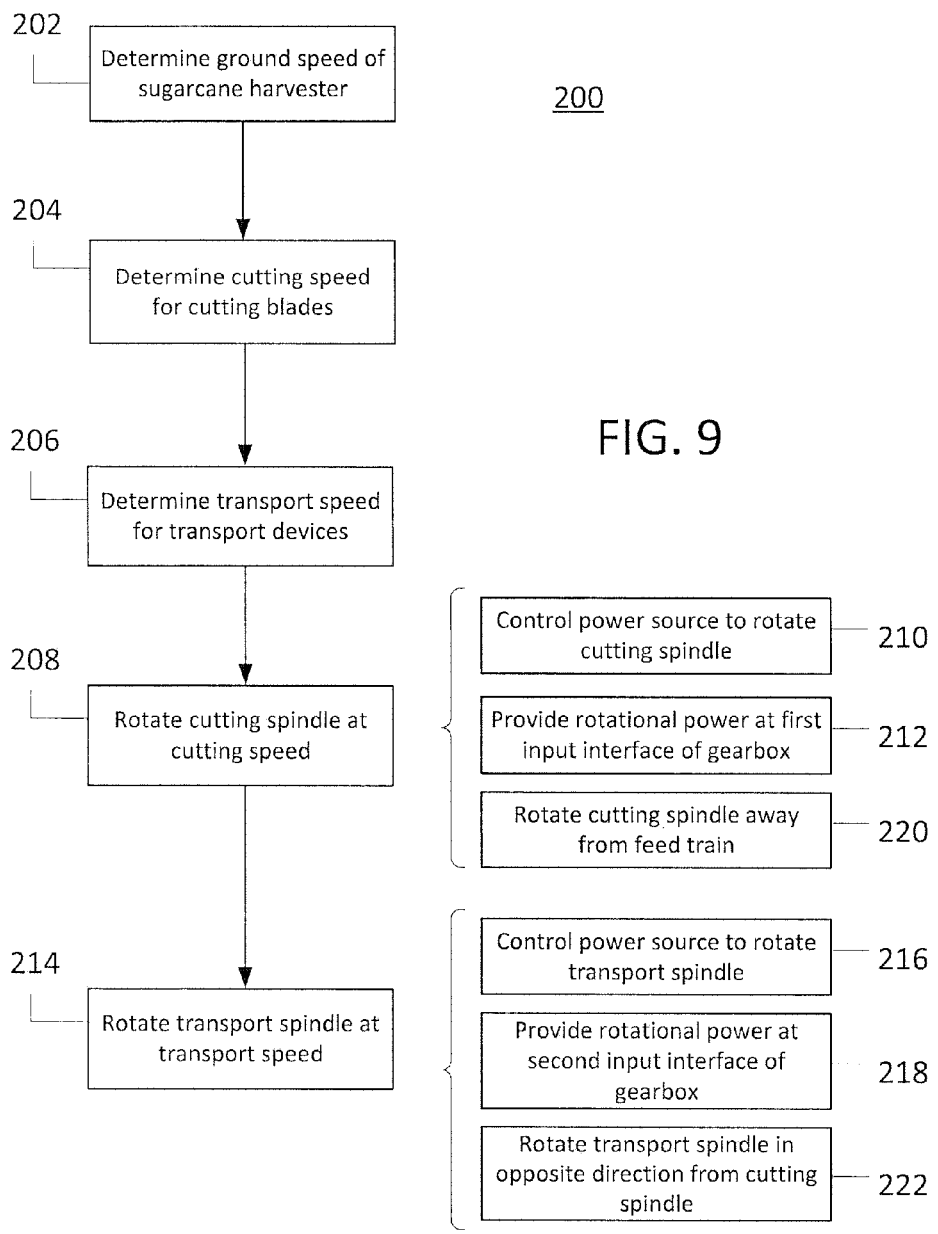
FIG. 9 is a diagrammatic view of an example basecutter control method for use with the harvester of FIG. 1.

Referring also to FIG. 9, the BC method 200 may include determining various factors upon which the cutting speeds for the cutting blades and transport devices may be determined. In certain implementations, the method 200 may include determining 202 the ground speed of the relevant sugarcane harvester. For example, the wheel speed sensor 62 or engine speed sensor 64 (see FIG. 1) may gather appropriate speed data (e.g., indicators of wheel speed or engine speed) and may transmit the speed data to the controller 60. The controller 60 may then analyze the speed data in order to determine 202 the current ground speed of the harvester 20. It will be understood, however, that other implementations may be possible. For example, the sensors 62 and 64 may include various controllers (not shown) or be included in various controllers (not shown), such that the sensors 62 and 64 or the controllers in which the sensors 62 and 64 are included may directly determine 202 the current ground speed of the harvester 20. Likewise, various factors other than indicators of wheel speed or engine speed may be utilized to determine 202 the ground speed.

The method 200 may further include determining 204 a cutting speed for one or more sets of cutting blades and determining 206 a transport speed for one or more transport devices. In certain implementations, the cutting speed and transport speed may be determined 204 and 206 based upon the determined 202 ground speed. In the embodiment depicted in FIG. 2, for example, the controller 60 (not depicted in FIG. 2) may utilize the determined 202 ground speed (or various other factors) to determine 204 an appropriate speed for the rotation of the cutting spindle 90 and to determine 206 an appropriate speed for the rotation of the transport spindle 92.

The cutting speed and transport speed may be determined 204 and 206 in various ways. In certain implementations, for example, a calibrated look-up table may be utilized to map ground speed (or other parameters) to appropriate cutting and transport speeds for the various cutting blades and transport devices. Accordingly, the cutting and transport speeds may be determined 204 and 206 based upon interrogating the look-up table. In certain implementations, a mathematical model (e.g., a set of equations) relating ground speed (or other factors) to cutting and transport speeds may be determined. The cutting and transport speeds may then be determined 204 and 206 based upon the model.

In certain implementations, the cutting and transport speeds may be determined 204 and 206 continuously (or near-continuously) as the relevant vehicle operates. In certain implementations, the cutting and transport speeds may be determined 204 and 206 at predetermined intervals or with other timing.

In certain implementations, the cutting speed and transport speeds may be determined 204 and 206 based upon manual (or other) input from an operator. For example, the cab 28 may include various input devices (not shown), such as various switches or levers, for control of the cutting and transport speeds. In certain implementations, continuous adjustment of these speeds may be possible (e.g., via a speed-control knob). In certain implementations, only discrete speeds may be selected (e.g., via a selector switch). In certain implementations, suggested cutting and transport speeds may be provided to an operator. For example, an display screen or other interface (not shown) in the cab 28 may indicate to an operator a recommended cutting speed or recommended transport speed for the cutting and transport spindles based upon various factors (e.g., the determined 202 ground speed, the current field conditions or layout, and so on). The operator may then determine whether to accept the recommendation, and may actuate the speed-control input devices accordingly.

It will be understood that the cutting and transport speeds may be determined 204 and 206 directly or indirectly. In certain implementations, for example, the cutting and transport speeds may be determined 204 and 206 as the actual rotational speed of the relevant cutting blades and transport devices, respectively. In certain implementations, alternatively, the cutting and transport speeds may be determined 204 and 206 as the output speed for a relevant motor (or motors), which may result a desired rotational speed of the relevant cutting blades and transport devices. For example, where a gearbox (e.g., the gearbox 70) is utilized between a relevant motor and the cutting and transport spindles (e.g., the spindles 90 and 92), the method 200 may include determining 204 and 206 the input speed (or speeds) at the gearbox that may result in the appropriate rotational speed of the relevant cutting blades and transport devices.

After the cutting and transport speeds have been determined 204 and 206, the method 200 may include controlling the speeds of the relevant cutting and transport spindles accordingly. In certain implementations, the controller 60 may control 210 operation of a power source for the cutting spindle (or cutting spindles) based upon the determined 204 cutting speed. For example, in the embodiment depicted in FIG. 7, once the appropriate cutting speed has been determined 204, the controller 60 may control 210 the operation of the motors 130 (e.g., by controlling operation of variable displacement pumps that drive the motors 130) in order to provide 212 rotational power, at an appropriate rotational speed, at the input interfaces 116. Likewise, in certain implementations, the controller 60 may control 214 operation of a power source for the transport spindle (or transport spindles) based upon the determined 206 transport speed. For example, in the embodiment depicted in FIG. 7, once the appropriate transport speed has been determined 206, the controller 60 may control 216 operation of the motor 132 (e.g., by controlling operation of a variable displacement pump that drives the motor 132) in order to provide 218 rotational power, at an appropriate speed, at the input interface 118.

In certain implementations, the method 200 may include rotating 222 a transport spindle in an opposite direction from a cutting spindle. For example, again referring to the embodiment depicted in FIG. 7, the controller 60 may determine 206 that an appropriate transport speed may be obtained by rotating the carrying disks 138, transport arms 140, and transport paddles 142 in the feed direction 152, as the disks 138, arms 140, and paddles 142 pass between the two spindles 136. The controller 60 may then control 216 the motor 132 to rotate the transport spindles 136 accordingly. Further, the controller 60 may determine 204 that an appropriate cutting speed may be obtained by rotating the cutting blades 144 in the opposite direction from the carrying disks 138, transport arms 140 and transport paddles 142 (i.e., against the feed direction 152). The controller 60 may then control 210 the motors 130 (e.g., simultaneously with the control of the motor 132) to rotate the cutting spindles 134 appropriately.

As will be appreciated by one skilled in the art, certain aspects of the disclosed subject matter may be embodied as a method, system (e.g., a work vehicle control system included in the vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A basecutter for a sugarcane harvester, the basecutter comprising:
    a cutting spindle;
    a transport spindle;
    at least one power source configured to rotate the cutting spindle and the transport spindle, in order to harvest sugarcane;
    one or more cutting blades for cutting sugarcane, the one or more cutting blades being attached to the cutting spindle; and
    one or more transport devices for moving cut sugarcane into the sugarcane harvester, the one or more transport devices being attached to the transport spindle;
    wherein one of the cutting spindle and the transport spindle is configured to rotate within a bore through the other of the cutting spindle and the transport spindle; and
    wherein the cutting spindle and the transport spindle are configured to rotate in opposite directions.

2. The basecutter of claim 1, further comprising:
    a basecutter gearbox having at least one input interface and first and second output interfaces, the first output interface being configured to rotate the cutting spindle, and the second output interface being configured to rotate the transport spindle;
    wherein the at least one power source is configured to provide rotational power to the basecutter gearbox via the at least one input interface;
    wherein the basecutter gearbox is configured to transmit power received at the at least one input interface to the first and second output interfaces, in order to rotate the first and second output interfaces at different speeds.

3. The basecutter of claim 2, wherein the basecutter gearbox includes first and second input interfaces; and
    wherein a first power source is configured to provide rotational power to the first input interface;
    wherein a second power source is configured to provide rotational power to the second input interface;
    wherein rotational power received at the first input interface causes the first output interface to rotate the cutting spindle; and
    wherein rotational power received at the second input interface causes the second output interface to rotate the transport spindle.

4. The basecutter of claim 2, further comprising:
    a second cutting spindle;
    a second transport spindle;
    one or more additional cutting blades for cutting sugarcane, the one or more additional cutting blades being attached to the second cutting spindle; and
    one or more additional transport devices for moving cut sugarcane into the sugarcane harvester, the one or more additional transport devices being attached to the second transport spindle;
    wherein the basecutter gearbox further includes first and second additional output interfaces, the first additional output interface being configured to rotate the second cutting spindle, and the second additional output interface being configured to rotate the second transport spindle;

wherein the basecutter gearbox is further configured to transmit power received at the at least one input interface to the first and second additional output interfaces, in order to rotate the first and second additional output interfaces at different speeds.

5. The basecutter of claim 4, wherein the basecutter gearbox is configured to rotate the first output interface and the first additional output interface at a first common speed and to rotate the second output interface and the second additional output interface at a second common speed, whereby the one or more cutting blades and the one or more additional cutting blades are rotated at a common cutting speed and the one or more transport devices and the one or more additional transport devices are rotated at a common transport speed.

6. The basecutter of claim 1, wherein the cutting spindle is rotated in a first rotational direction, whereby cutting force applied by the one or more cutting blades to the sugarcane urges the sugarcane away from a feed train of the sugarcane harvester; and wherein the transport spindle is rotated in a second rotational direction different from the first rotational direction, whereby the one or more transport devices urge cut sugarcane toward the feed train.

7. The basecutter of claim 1, wherein the one or more transport devices include one or more of a carrying disk and a transport paddle.

8. The basecutter of claim 7, wherein the carrying disk includes one or more transport arms extending, at least in part, radially outward from the transport spindle.

9. The basecutter of claim 1, wherein the one or more transport devices include one or more transport spokes extending, at least in part, radially outward from the transport spindle.

10. A method for controlling a basecutter of a sugarcane harvester, the basecutter including a cutting spindle, a transport spindle, at least one power source configured to rotate the cutting spindle and the transport spindle in order to harvest sugarcane, one or more cutting blades attached to the cutting spindle, and one or more transport devices attached to the transport spindle, the method comprising:

determining, by one or more controllers, a cutting speed for the one or more cutting blades and a transport speed for the one or more transport devices, the cutting speed being different from the transport speed;

controlling the at least one power source, by the one or more controllers, to rotate the cutting spindle at the cutting speed;

controlling the at least one power source, by the one or more controllers, to rotate the transport spindle at the transport speed;

controlling the at least one power source to rotate the cutting spindle at the cutting speed in a first direction; and controlling the at least one power source to rotate the transport spindle at the transport speed in a second direction different from the first direction.

11. The method of claim 10, wherein the basecutter further includes a basecutter gearbox having at least one input interface and first and second output interfaces, the first output interface being configured to rotate the cutting spindle, and the second output interface being configured to rotate the transport spindle;

wherein the at least one power source is configured to provide rotational power to the basecutter gearbox via the at least one input interface;

wherein the basecutter gearbox is configured to transmit power received at the at least one input interface to the first arid second output interfaces, in order to rotate the first and second output interfaces at different speeds.

12. The method of claim 11, wherein the basecutter gearbox includes first and second input interfaces and the at least one power source includes first and second power sources, the method further comprising:

controlling the first power source to provide rotational power to the first input interface; and controlling the second power source to provide rotational power to the second input interface;

wherein rotational power received at the first input interface causes the first output interface to rotate the cutting spindle; and wherein rotational power received at the second input interface causes the second output interface to rotate the transport spindle.

13. The method of claim 11, wherein the basecutter further includes a second cutting spindle, a second transport spindle, one or more additional cutting blades attached to the second cutting spindle, and one or more additional transport devices attached to the second transport spindle;

wherein the basecutter gearbox further includes first and second additional output interfaces, the first additional output interface being configured to rotate the second cutting spindle, and the second additional output interface being configured to rotate the second transport spindle;

wherein the basecutter gearbox is further configured to transmit power received at the at least one input interface to the first and second additional output interfaces, in order to rotate the first and second additional output interfaces at different speeds.

14. The method of claim 13, further comprising:

controlling the at least one power source to rotate the first output interface and the first additional output interface at a first common speed; and controlling the at least one power source to rotate the second output interface and the second additional output interface at a second common speed;

whereby the one or more cutting blades and the one or more additional cutting blades are rotated at a common cutting speed and the one or more transport devices and the one or more additional transport devices are rotated at a common transport speed.

15. The method of claim 10, wherein the cutting spindle is rotated in the first rotational direction, whereby cutting force applied by the one or more cutting blades to the sugarcane urges the sugarcane away from a feed train of the sugarcane harvester; and wherein the transport spindle is rotated in the second rotational direction different from the first rotational direction, whereby the one or more transport devices urge cut sugarcane toward the feed train.

16. The method of claim 10, further comprising:

determining, by one or more controllers, a ground speed of the sugarcane harvester;

wherein one or more of the cutting speed and the transport speed are determined based upon, at least in part, the determined ground speed.

17. The method of claim 16 wherein the one or more transport devices include a carrying disk with one or more transport arms extending, at least in part, radially outward from the transport spindle.

18. The method of claim 10, wherein the one or more transport devices include one or more transport spokes extending, at least in part, radially outward from the transport spindle.

* * * * *